Oct. 25, 1932.  J. S. DOWNARD  1,884,618
APPARATUS FOR PREPARING ASPHALTIC COMPOSITION
Original Filed Sept. 29, 1927
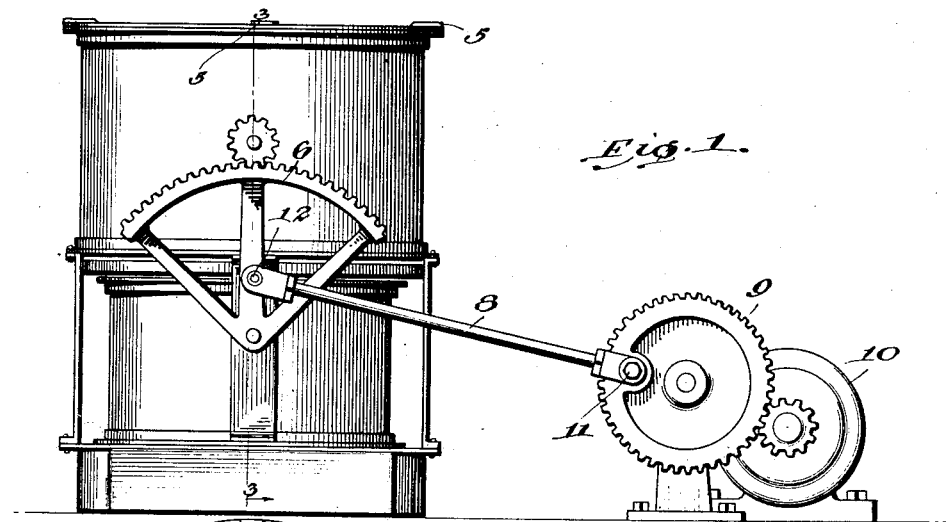
Fig. 1.
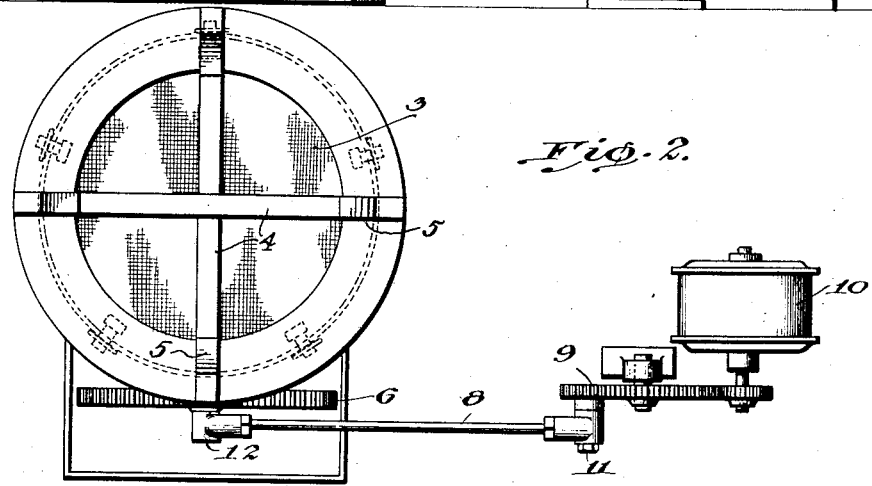
Fig. 2.
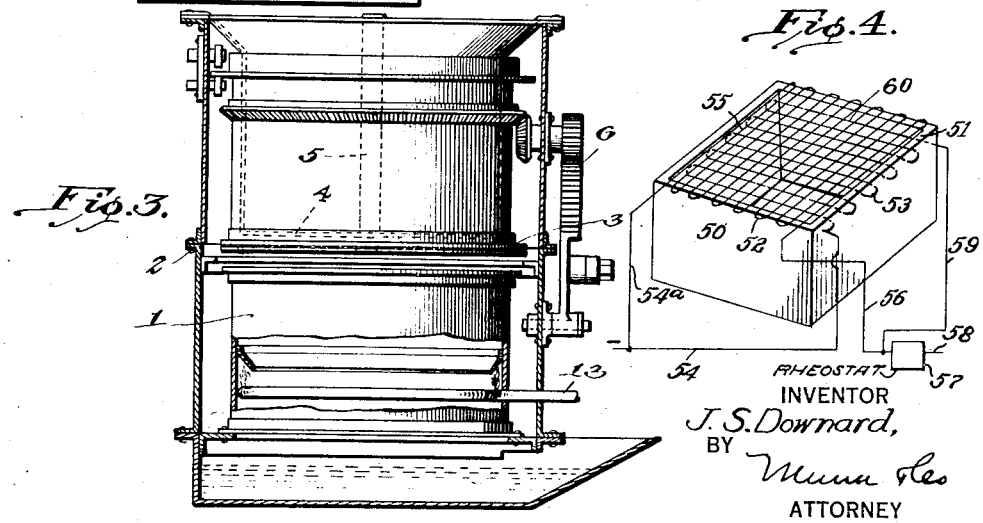
Fig. 3.
Fig. 4.
INVENTOR
J. S. Downard,
BY
ATTORNEY Patented Oct. 25, 1932

1,884,618

UNITED STATES PATENT OFFICE

JAMES S. DOWNARD, OF FORT THOMAS, KENTUCKY

APPARATUS FOR PREPARING ASPHALTIC COMPOSITION

Original application filed September 29, 1927, Serial No. 222,908. Divided and this application filed September 18, 1929. Serial No. 393,531.

This invention relates to a device for granulating an asphalt, described and claimed in my co-pending application, Serial No. 222,908, filed September 29, 1927, of which the present application is a division.

It is well known that granular asphalt compounds may be made by passing mixtures of sand and mineral matter through heated shaking screens and dropping the screened material into a cold water bath. Difficulty arises in all heretofore practiced processes because the so-called "granular" shaking screens, for example, when exposed to the air soon become clogged for the hot asphalt is in fact plastered over the screen or screen wire and immediately begins to grow cold and change, first to a plastic form then to a solid form, and in this manner closes the meshes first retarding the operation, then stopping the passage of all material.

Furthermore, the horizontal screen when shaking causes the material to ride or grate over a large surface, constantly cooling the compound by exposure to the air, and there is no force to cause the viscous material to pass through the screen except its own weight. A rotary screen has the same defects, and in fact, is more defective than the shaking screen or electrically vibrated screen.

The present invention seeks to provide a new form of screen for granulating the asphalt which will be free from the above mentioned difficulties by the combination of a form or design of container in relation to a screening surface so that gravity will assist or facilitate the passage of the materials through the screen, and devices to maintain the screen heated, this overcoming all the difficulties named. The mechanical movement may be any of those conventionally employed, provided the screens be loaded so as to cause the weight of the material to cause it to pass the screen and provided the wires may be kept in a heated state so as to cause them to remain clean.

To keep the said screenwire heated, there may be employed gas burners or other heating device so inclosed and insulated that the screen wire remains hot or heated, or the said screen surface may be adapted to be heated electrically, as by forming the screen of material having a relatively high electrical resistance, such as nichrome, or German silver or any other well known material having a high electrical resistance.

The apparatus employed is shown in the accompanying drawing, in which:

Figure 1 represents a side elevation of the shaking screen with operating mechanism, Figure 2 is a plan view of the screen, Figure 3 is a view taken on the section line 3—3 of Figure 1.

Fig. 4 is a view in perspective of an electrically heated screen.

Referring first to the means for granulating the asphalt it will be seen that the granulator comprises a casing 1 divided into a plurality of sections, as may be desired, this casing being supported in the frame 2. Supported within this frame there is also a screen 3 which is in engagement with a wiper bar 4 which is supported by the spider 5. Motion is imparted to the casing and screen by means of the bevelled pinion 6 operated in the bevelled girth gear 7, motion being imparted thereto through the rod 8 which is operated by the gear wheel 9 which is actuated by a motor 10, or any other source of power. It will be seen that the rod 8 is bevelled at 11 to the wheel 9 and also pivoted at 12 to the pinion 6. It will be seen that the structure as shown will be capable of being operated through a quadrant of a circle. Heat is applied to the screen by any desired means as above pointed out, gas being specifically illustrated. A pipe 13 is adapted to convey gas to the interior of the casing 1, gas burner (not shown) imparting heat to the said screen. The casing is provided substantially as a cylinder open at both ends, set on end, supported so as to rotate one-fourth of a circle or a quadrant so as to cause material therein to grate over the surface of a screen wire while under full force of gravity, it being so designed that the cylinder may be rotated with sufficient asphalt therein to cause it to pass the screen 1, maintained in a heated condition. It will thus be seen that there is provided force to cause the passage of the asphalt through the screen in the instance illustrated, this force being gravity, but it being further understood that appropriate mechanical means may also be provided, if desired, such provisions being apparent to a skilled mechanic.

1. A means to apply force to cause passage through the screen, in this instance gravity, although mechanical means could be added.

2. A heated screen and means to heat the screen.

3. A rotating or granulating action in combination with the above means.

4. A mechanical sweep working over the heated screen.

5. A design or form of inclosure that permits the entire operation to be insulated and kept hot.

The screen may be varied in size and also in mesh, and it is arranged for quick removal and discharge. As pure asphalt is used in greater quantity the meshes are made smaller and when it is entirely free from mineral matter it passes through the screen in streams.

In such a case an atomizer is used, (not shown in the drawing) to blow the material into drops. In practice, this atomizer is only an air pipe carrying air under pressure.

The whole device is mounted over a cold water bath (not shown) so that the material will fall into cold water and cool to granular form, it being removed from said bath preferably by mechanical scrapers or by any other desired means.

In general practice, asphalt is cast into barrels at the refinery and in this condition comes to the mixing plant where it is cast into melting kettles. These kettles are either provided with direct heat underneath, or with coils of pipe through which steam circulates. The asphalt is melted by contact with the kettle or pipes, and steam is preferable for heating since this has the advantage of not overheating the bitumen which may be changed in character in various ways if too much heat is applied. Slow heating is necessary, and in the case of direct fire heating injury to some extent is almost certain as the bitumen touches the hot iron and in the beginning of the operation no circulation of the material is possible. Asphalt is a poor conductor to heat so that the melting is of necessity a slow operation at the best. To melt a large kettle takes from twenty-four to thirty-six hours. The conventional process of mixing asphalt with mineral aggregates requires that the material must all be heated far above the point required to incorporate the same, so that the material may be hauled hot to the work, often for considerable distances.

With granular asphalt a new element is introduced, namely:

A method by which the bitumen may be circulated cold; when granular it is not necessary to take the application of heat through the bitumen which remains "en masse" except as it melts or secures heat from the melted portion in which it is immersed. In such a granular process the melted bitumen flows away or is coated on the aggregate.

Then as the heating is carried on at the point of application of the material, only enough heat is required to melt and mix, no heat being required to cover the loss during transportation. The small circulating granular pieces of bitumen receive the full effect of the heated gases from the combustion chamber which are blown through the circulating mass.

In the preparation of the asphaltic composition, it would be necessary to maintain a predetermined temperature of the asphalt in order that it will flow gradually and it will likewise be necessary to maintain a predetermined pressure. By this means the asphaltic composition will pass through the screen in strings in a uniform manner.

The electrically heated screen shown in Fig. 4 is composed of a base member 50 formed of insulating material such as marble or porcelain which has a central opening 51. Lugs 52 and 53 formed of similar material as the base member are provided in spaced relation around the opening 51 for supporting electric resistance wires. A wire 54 forms the outlet for the current which is carried across the opening 51 as shown at 55 back and forth in a continuous manner and supported by the lugs 52. The other end of the wire 56 is connected with a rheostat 57. An inlet 58 connected with the source of current is also connected with the rheostat.

A second wire 59 is also connected with the rheostat and is connected with the lugs 55 and carried across the opening 51 as shown at 60 transversely to the wires 55. This wire is continuous and is connected with the outlet 54.

The wires 60 are spaced below the wires 55 in order to prevent short circuiting or the wires 55 may be insulated from the wires 60 in any approved manner. It will be noted by this construction that the screen is formed of electric resistance wire so that when the current is passed through the wires 56 and 59 the screen will be heated and the current is controlled by the rheostat 57.

The cold asphalt may be placed in bulk on the heated screen wires and the wires will gradually cause the asphalt to run through the space between the wires and form strings. These strings are cut by a wiper arm which may be heated and which is movable across the screen.

I claim:

1. A device for dividing asphalt and the like into small particles, comprising a cylinder open at both ends, the said cylinder being oscillatably supported, means for oscillating the said cylinder, a screen within the said cylinder and rabble arm adjacent the screen and adapted to force the asphalt therethrough, a spider carrying said rabble arm, and means for maintaining the screen in a heated condition.

2. A device for dividing asphalt and the like into small particles, comprising a cylinder open at both ends, the said cylinder being oscillatably supported, means for oscillating the said cylinder, a screen within the cylinder and rabble arm adjacent the screen and adapted to force the asphalt therethrough, a spider carrying said rabble arm, and means for maintaining the screen in a heated condition, said screen being formed of high electrical resistance wire whereby the screen becomes heated through its own resistance when an electric current is passed through the said screen.

3. An apparatus for dividing asphalt and the like into strings, comprising a container, a screen within the container, said screen being formed of electrical resistance material whereby the screen becomes heated through its own resistance when an electric current is passed through said screen and means for supplying an electric current to the screen.

4. An apparatus for dividing asphalt and the like into small particles, comprising an oscillatable container, means for oscillating the container, means for maintaining the screen in heated condition, and means co-operating with the screen for cutting off lengths of the asphalt expressed through the screen.

5. An apparatus for dividing asphalt and the like into small particles, comprising a container, a screen within the container, means for maintaining the screen in heated condition, means co-operating with the screen for cutting off lengths of the asphalt expressed through the screen, and means for moving the container relative to the last-mentioned means.

6. An apparatus for dividing asphalt and the like into small particles, comprising an oscillatable container, means for oscillating the container, a screen within the container, means for maintaining the screen in heated condition, means for expressing the asphalt through the heated screen, and means co-operating with the screen for cutting off lengths of the asphalt expressed through the screen.

7. An apparatus for dividing asphaltic materials into particles or strings of definite size comprising a container, a screen within the container and formed of electrical resistance wires adapted to have an electrical current passed therethrough to cause heating of the screen, and means cooperating with the screen for cutting off definite lengths of the asphalt passing through the screen, and means for supplying an electric current to the screen.

8. An apparatus for dividing asphalt materials into particles or strings of definite size comprising a container, a screen within the container and formed of electrical resistance wires adapted to have an electrical current passed therethrough to cause heating of the screen, and means co-operating with the screen for cutting off definite lengths of the asphalt passing through the screen, and means for causing relative movements between the screen and last-mentioned means, and means for supplying an electric current to the screen.

JAMES S. DOWNARD.